Figure 1:
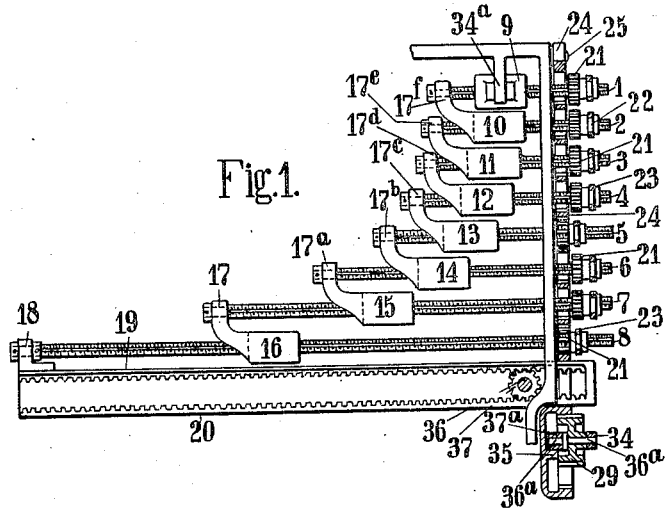

J. J. KNECHT.
VARIABLE TRANSMISSION GEAR.
APPLICATION FILED SEPT. 8, 1908.

935,034.

Patented Sept. 28, 1909.
5 SHEETS—SHEET 1.

Witnesses:—
C. H. Crawford
E. Schallinger

Inventor:—
Johann Jakob Knecht
by B. Singer Attorney

J. J. KNECHT.
VARIABLE TRANSMISSION GEAR.
APPLICATION FILED SEPT. 8, 1908.

935,034.

Patented Sept. 28, 1909.
5 SHEETS—SHEET 2.

Witnesses:-
C. H. Crawford
E. Schallinger

Inventor:-
Johann Jakob Knecht
by B. Singer
Attorney

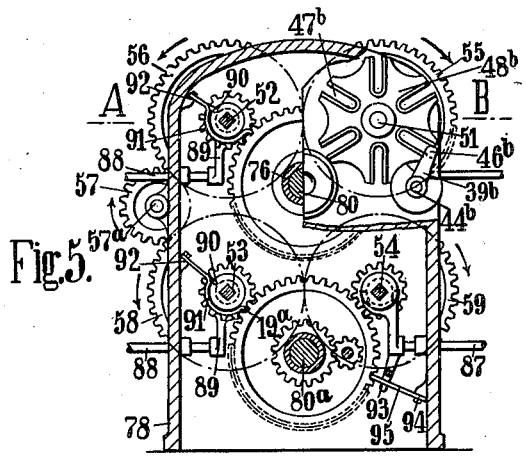
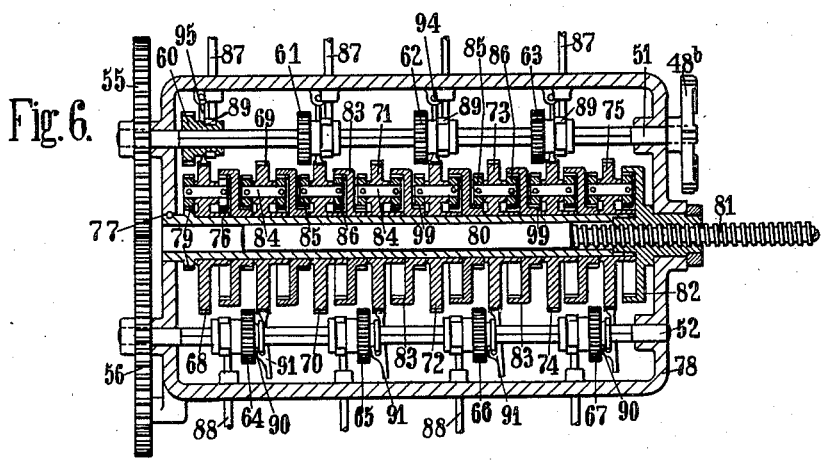

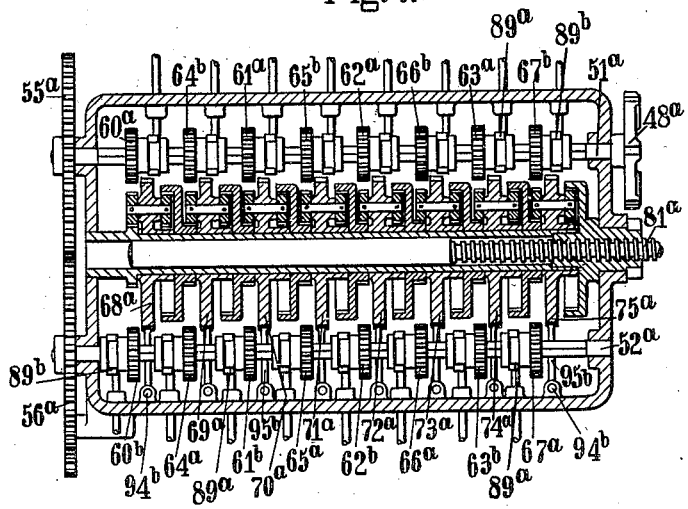

J. J. KNECHT.
VARIABLE TRANSMISSION GEAR.
APPLICATION FILED SEPT. 8, 1908.
935,034.
Patented Sept. 28, 1909.
5 SHEETS—SHEET 5.
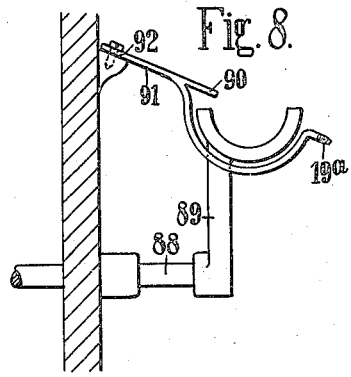
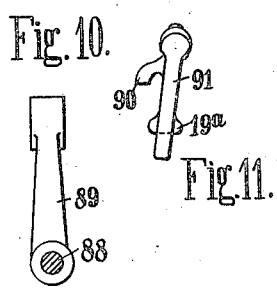
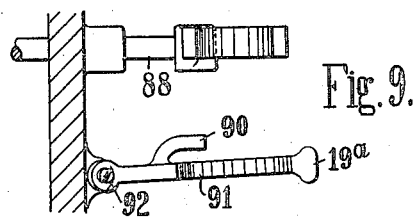
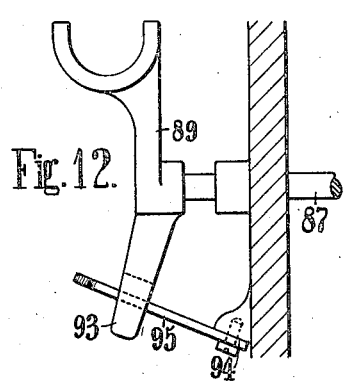
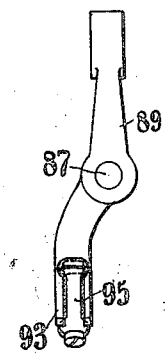
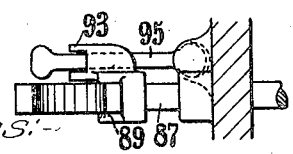
Witnesses:—
C. M. Crawford
E. Schallinger
Inventor:—
Johann Jakob Knecht
by B. Singer
Attorney

UNITED STATES PATENT OFFICE.

JOHANN JAKOB KNECHT, OF CHEMNITZ, GERMANY.

VARIABLE-TRANSMISSION GEAR.

935,034.

Specification of Letters Patent.   Patented Sept. 28, 1909.

Application filed September 3, 1908.   Serial No. 452,009.

*To all whom it may concern:*

Be it known that I, JOHANN JAKOB KNECHT, subject of the German Emperor, residing at Chemnitz, Saxony, Germany, have invented certain new and useful Improvements in Variable-Transmission Gear, of which the following is a specification.

This invention relates to mechanism particularly for use in automatic embroidering machines, for converting a uniform rotary movement into a rectilinear movement of variable length, and an important object is to provide improved mechanism for moving the embroidery frame in accordance with the requirements of the pattern.

The invention substantially consists in using, for actuating an axially movable worm connected to the embroidery frame, a gear-train the members of which can be severally and collectively actuated by a single shaft and are adapted to severally and collectively actuate the worm, the said members being so proportioned that the values of the movements which they can severally impart to the worm are in geometrical series.

After the frame has been moved into position for the first stitch, the movement required to place it in position for the second stitch may be added to the first movement by suitably actuating the mechanism; but in this instance if the first movement was wrong, owing to false action of the jacquard card or the like, so that the first stitch is wrongly placed, the second and subsequent stitches will also be wrongly placed. To prevent this, each movement of the frame may be caused to start from the same position, the frame being moved back to that position after each stitch by reversal of the respective members of the gear-train. To avoid unnecessary movement of the frame, the forward movement for the next stitch may be impressed simultaneously with the return movement, so that the actual movement of the frame is the resultant of movements imparted by oppositely acting gears.

Figure 2:
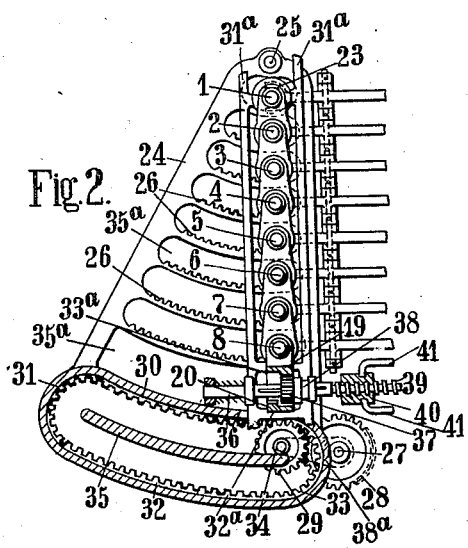
Figure 3:
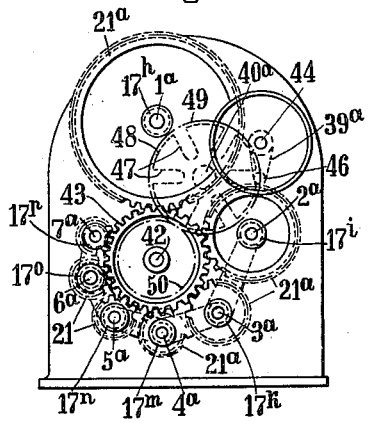
Figure 4:
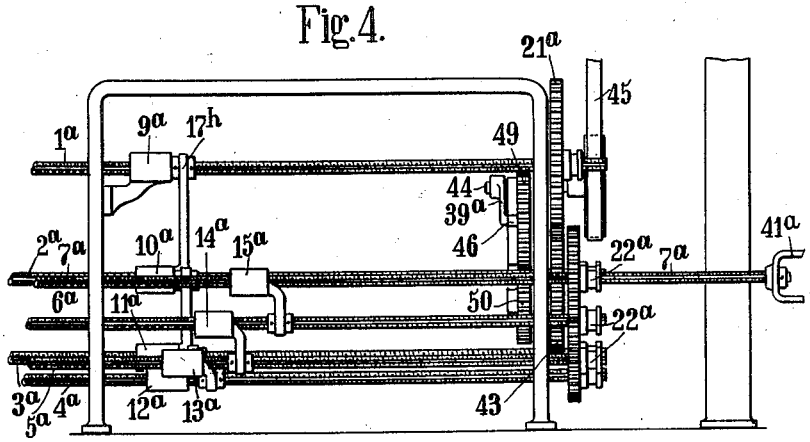

In order that the invention may be clearly understood reference will be made to the accompanying drawings in which four constructional forms embodying the invention are shown by way of example, and in which:

Figures 1 and 2 are respectively a sectional side elevation and front elevation of one constructional form, and Figs. 3 and 4 an end and side elevation of another form. Figs. 5 and 6 show a third form of construction in sectional end elevation and in section on the line A—B of Fig. 5, whereas Fig. 7 is a horizontal section through a fourth constructional form. Figs. 8, 9, 10, 11, 12, 13 and 14 show details of the locking mechanism in Figs. 5, 6 and 7 on a larger scale.

Referring first to Figs. 1 and 2, $31^a$ represents a fixed frame, on which a frame consisting of two rack-bars 19 and 20 is movable in guides $32^a$ and $33^a$. The frame 19, 20 carries a bearing 18 in which one journal of a screw-spindle 8 is revoluble. An internally threaded sleeve or block 16 on the screw 8 has an upwardly projecting part with a bearing 17 for the journal of a screw 7. A sleeve 15 mounted on the latter has a bearing $17^a$ for the journal of a screw 6. Additional screws 5, 4, 3, 2 and 1 have bearings $17^b$, $17^c$, $17^d$, $17^e$ and $17^f$ carried by sleeves 14, 13, 12, 11 and 10. A sleeve 9 is traversed by the screw 1, and an arm $34^a$ prevents rotation of the said sleeve 9. Suitable means are provided for accurately guiding the screws 1 to 8 and frame 19, 20, but these means are not illustrated, in order not to over-load the drawing with detail.

On each of the screw-spindles 1 to 8 is mounted a pinion 21 which is axially movable on the spindle, but not rotatable relatively thereto. Each pinion 21 has a laterally projecting hub-part with an annular groove 22 formed therein, and the grooves 22 are engaged by forks 23 which serve for moving the pinions into and out of mesh with curved racks 26. The latter are parts of a sector-shaped frame 24 having segmental apertures $35^a$. The pitch-lines of the racks are segments of circles concentric with a pivot 25 about which the sector is revoluble, and the lengths of the racks are proportional to their distances from the said pivot. The screws 1 to 8 are of different pitches, the ratio of the pitches being such that the values of the displacements imparted to the screws by rotation of the sector are in geometrical series, namely as 1 : 2 : 4 : 8 : 16 : 32 : 64 : 128. The sector 24 is actuated by means of a continuously rotating shaft 27 and gear-wheels 28 and 29. As clearly shown in Fig. 1, the gear-wheel 29 is of double breadth, and it meshes not only with the gear-wheel 28 but also with a series of toothed segments 30, 31, 32, 33 integral with the sector 24. A roller $37^a$ is mounted on the axle $36^a$ of the gear-wheel 29 and rolls on a segmental ledge 35 between the racks 30 and 32. The axle $36^a$ is fixed to the end 34 of an arm $38^a$ rotatable on the shaft 27.

As clearly shown in Fig. 2, the teeth of the rack-bars 19 and 20 are in different vertical planes, so that a gear wheel 37 transversely slidable between the bars on a shaft 36 can be alternatively meshed with either rack. For displacing the wheel 37 the hub thereof has a groove 38 adapted to be engaged by a fork not shown in the drawing. The shaft 36 has a worm 39 on it, engaging an internally threaded, non-rotatable sleeve 40, which is connected by rods 41 to the embroidery frame which is to be reciprocated.

The action of the mechanism shown in Figs. 1 and 2 is as follows: Uniform rotation of the gear wheel 28 causes the pinion 29 to rock the sector 24 toward the right (Fig. 2) by its co-action with the rack 30. During this rocking movement toward the right the roller $37^a$ is on the upper surface of the ledge 35. Then the pinion rolls down the rack 31 to the rack 32, carrying the roller $37^a$ to the under-surface of the ledge 35. The co-action of the pinion with the rack 32 causes the sector to rock to the left, whereupon the pinion rolls up the rack 33 to the rack 30, into the position shown in Fig. 2, from which it started. During the rocking of the sector 24 those pinions 21 which are in mesh with their respective racks 26 are rotated and rotate the screw-spindles on which they are mounted, so that the sleeves on the respective screws are displaced through varying distances. In Fig. 1, by way of example the pinions on the spindles 5 and 8 are shown in mesh with their racks 26, so that only the spindles 5 and 8 receive axial movement due to rotation in the sleeves which they traverse. The spindles 6 and 7 between the spindles 5 and 8 are, however, also axially displaced, owing to their connection with the sleeves 16 and 14, and interconnection by the sleeve 15. The movement due to the rotation of the screw 5 in the sleeve 13 is, therefore, transmitted to the screw 8, and the total movement of the latter is the sum of the movements due to rotation of the screws in the sleeves 13 and 16.

It will be clear that by actuating the forks for shifting the pinions 21 and gear-wheel 37, the worm 39 can be moved through varying distances in either direction, so that the sleeve 40 and embroidery frame are reciprocated as required. The actuation of the forks may be automatically performed, according to the requirements of the pattern, with the aid of automatic pattern mechanism.

The mechanism shown in Figs. 1 and 2 may be modified by making the racks 26 straight instead of curvilinear, and moving them in rectilinear guides.

Referring now to the constructional form shown in Figs. 3 and 4, 42 is the driving shaft, to which a gear-wheel 43 is fixed. About the latter seven screw-spindles $1^a$, $2^a$, $3^a$, $4^a$, $5^a$, $6^a$, $7^a$ are so grouped that pinions $21^a$ which are slidable but not rotatable thereon can be moved into engagement with the gear-wheel 43. On the screws are mounted sleeves $9^a$, $10^a$, $11^a$, $12^a$, $13^a$, $14^a$, $15^a$, with eyes or bearings $17^l$, $17^k$, $17^m$, $17^n$, $17^o$, $17^p$ which inter-connect the spindles in a manner analogous to that described with reference to Figs. 1 and 2. The hub of each pinion $21^a$ has an annular groove $22^a$ engaged by a fork not shown in the drawing, by means of which each pinion can be moved into and out of engagement with the gear-wheel 43. The diameters of the pinions $21^a$ and the pitches of the screws are so proportioned that the values of the movements imparted to the sleeves by rotation of the gear-wheel 43 through any given angle are in geometrical series.

A continuously rotating shaft 44 driven by means of a belt 45 has fixed to it an arm $39^a$ with a laterally projecting pin or gudgeon 46. To a shaft $40^a$ is fixed a disk 48 provided with radial slots 47. The disk 48 and lever $39^a$ are so proportioned and arranged that during each revolution of the shaft 44 and arm $39^a$ the pin 46 enters one of the slots 47 and imparts one sixth of a revolution to the disk 48. To the latter is fixed a gear-wheel 49 meshing with a gear-wheel 50 fixed to the gear-wheel 43, so that during each revolution of the shaft 44 the wheel 43 makes a fraction of a revolution and then ceases to rotate. During the intervals of non-rotation of the wheel 43 the pinions $21^a$ are moved into or out of gear, in accordance with the requirements of the pattern to be produced. The spindle $7^a$ is connected by rods $41^a$ to the embroidery frame to be reciprocated.

In the constructional form shown in Figs. 5 and 6 there are four rotatable shafts 51, 52, 53, 54 connected to each other by gearing so that they revolve together. These shafts are driven by means of a continuously rotating shaft $44^b$ to which is fixed an arm $39^b$ provided with a pin $46^b$. A disk $48^b$ fixed to the shaft 51 has radial slots $47^b$ which are successively engaged by the pin $46^b$ during the rotation of the arm $39^b$, so that during each revolution of the shaft $44^b$ the disk makes one sixth of a revolution. The shaft 51 is connected to the shaft 52 by gear-wheels 55 and 56. A gear-wheel 57 fixed to a shaft $57^a$ meshes with the wheel 56 and also with a wheel 58 fixed to the shaft 53. The wheel 58 meshes with a wheel 59 fixed to the shaft 54. Arrows indicate, in Fig. 5, the directions of rotation of the gear wheels 55, 56, 57, 58, 59.

Between the shafts 51, 52, 53 and 54 are mounted spindles 80 and $80^a$ which are axially movable but not rotatable. Movement can be transmitted by the shafts 51 and 52 to the spindle 80, and by the shafts 53 and 54 in a similar manner to the spindle 80ª. The shafts 51 and 52, imparting rectilinear movement to the spindle 80, move the embroidery frame in one direction, for example horizontally, and the shafts 53 and 54 and spindle 80ª move the embroidery frame in the other direction, i. e. vertically.

The shafts 51 and 52 are squared between their bearings. On the shaft 51 are mounted four slidable pinions 60, 61, 62, 63, and the shaft 52 carries four slidable pinions 64, 65, 66, 67. The shafts 53 and 54 are similarly provided with slidable pinions not visible in the drawing.

To the casing 78 of the apparatus a tubular axle 76 is rigidly fixed at 77. On this axle are mounted revoluble gear wheels 68, 69, 70, 71, 72, 73, 74, 75. A ring of teeth 79 is fixed to the axle. Within the latter the spindle 80 is axially movable but not rotatable. A worm 81 fixed to the said spindle works in the internally threaded hub of a gear-wheel 82 which is rotatable but not axially movable. There are also seven rotatable but axially immovable wheels 83 on the axle 76, the wheels 83 being similar to the wheel 82, with the exception that their eyes are not screw-threaded.

Each of the wheels 68, 69, 70, 71, 72, 73, 74, 75 is traversed between its circumference and hub by a short rotatable axle 84, to the ends of which are fixed pinions 85 and 86. The pinion 85 carried by the wheel 68 meshes with the ring of teeth 79. Each of the pinions 86, with the exception of that carried by the wheel 75, meshes with inwardly directed teeth of the adjacent wheel 83, and each wheel 83 has a ring of teeth 99, similar to the teeth 79, meshing with the adjacent pinion 85. The pinion 86 carried by the wheel 75 meshes with the inwardly directed teeth of the gear-wheel 82. Each ring of inwardly directed teeth of the wheels 83 and 82 comprises twice as many teeth as form one of the rings 79 or 99. The pinions 85 and 86 are also uniform, as regards diameter and pitch.

The wheels 68, 69, 70, 71, 72, 73, 74, 75 are so positioned that the pinions 60, 61, 62, 63, 64, 65, 66, 67 can be severally or simultaneously brought into mesh therewith by means of forks 89; the latter engage the hubs of the pinions 60 to 67, so that by operating axles 87 and 88, to which the forks are fixed, the pinions are axially displaced on the shafts 51 and 52 respectively. The axles 87 and 88 are operated with the aid of the pattern apparatus, and may be rotated in either direction. During the intervals in which the wheels 69, 71, 73, 75 are not rotated by pinions 64, 65, 66, 67 they are locked by engagement with the ends 19ª of rods 91 rotatable about pivots 92; these rods are shown more clearly in Figs. 8, 9 and 11 and they have projections 90 engaging the hubs of the pinions 64, 65, 66, 67, so that when either of the latter is moved into engagement with the wheel which it drives the respective rod 91 is removed from its locking position. The forks 89 fixed to the axles 87 have downward projections 93 which engage rods 95 rotatable about pivots 94 as clearly shown in Figs. 12, 13 and 14. The free ends of the rods 95 enter tooth-gaps of the wheels 68, 70, 72 and 74 when the pinions 60, 61, 62, 63 are not meshed therewith, but when the respective wheels are meshed the rods are disengaged.

The gears are so proportioned that the values of the movements severally imparted to the worm 81 by actuation of the wheels 68 to 75 are in geometrical series.

The action of the mechanism shown in Figs. 5 and 6 is as follows: Rotation imparted, for example, to the wheel 68 causes the axle 84 carried by that wheel to rotate, with its pinion 85 rolling on the fixed ring of teeth 79 and its pinion 86 imparting to the adjacent wheel 83 rotation at an angular speed which exceeds that of the wheel 68. The teeth 99 of the said wheel 83 therefore rotate the pinion 85 carried by the wheel 69, and rotation in the opposite direction to that of the first wheel 83 is transmitted to the second wheel 83, by means of the respective axle 84 and pinion 86. If the wheel 69 is locked while this transmission of movement is taking place, the speed of the second wheel 83 is smaller than that of the first wheel 83. It has already been mentioned that the rings of inwardly directed teeth of the wheels 83 and 82 have twice as many teeth as the rings of teeth 99, and that the pinions 85 and 86 are uniform, so that the wheel 83 on the right hand side of the wheel 69 rotates at half the speed of the wheel 83 on the right hand side of the wheel 68. If the wheels 69 to 75 are all locked, each successive wheel 83 is rotated at half the speed of the preceding wheel 83, and in the opposite direction. The wheel 82, which belongs to the same series and is the last member thereof, rotates, therefore, through the smallest angle. If, however, several of the wheels 68 to 75, or all of them, are simultaneously rotated, the rotational movements imparted by them are added together, and the movement of the worm 81 is correspondingly increased. If, for example, rotation of the wheel 68 alone, through a given angle, moves the worm 1 millimeter, rotation of the wheel 69 alone, through the same angle, moves the worm 2 millimeters, and similarly the wheel 70 moves it 4 millimeters, the wheel 71 8 millimeters, the wheel 72 16 millimeters, the wheel 73 32 millimeters, the wheel 74 64 millimeters, and the wheel 75 128 millimeters. If the wheels 68 and 69 are simultaneously rotated the movements of 1 millimeter and 2 millimeters are added together to make a total movement of 3 millimeters, and if, for example, the wheels 68, 69 and 75 are simultaneously rotated the worm is moved $1 + 2 + 128 = 131$ millimeters.

The mechanism shown in Fig. 7 resembles that shown in Figs. 5 and 6, but allows of subtracting as well as adding the movements individually imparted by the gear-elements. The wheels $68^a$, $69^a$, $70^a$, $71^a$, $72^a$, $73^a$, $74^a$, $75^a$ correspond to the wheels 68 to 75 shown in Fig. 6. The shafts $51^a$ and $52^a$, corresponding to shafts 51, 52 in Fig. 6, carry pinions $60^a$, $61^a$, $62^a$, $63^a$ and $64^a$, $65^a$, $66^a$, $67^a$ respectively, corresponding to the pinions 60 to 67 in Fig. 6, but they also have mounted on them slidable pinions $64^b$, $65^b$, $66^b$, $67^b$ and $60^b$, $61^b$, $62^b$, $63^b$ respectively. $48^a$ is a disk with radial slots corresponding to disk 48 in Fig. 6, and the shafts $51^a$ and $52^a$ are geared to each other by means of wheels $55^a$ and $56^a$. The pinions $60^a$ to $67^a$ and $60^b$ to $67^b$ are moved into and out of engagement by means of forks $89^a$ and $89^b$ respectively, and the wheels $68^a$ to $75^a$ are locked, when not rotated, by means of dogs $95^b$. Both the dogs $95^b$ engaging a wheel of the series $68^a$ to $75^a$ must be disengaged therefrom when either of the respective pinions belonging to the series $60^a$ to $67^a$ and $60^b$ to $67^b$ is moved into engagement.

When the pinions $60^a$ to $67^a$ are meshed with the wheels $68^a$ to $75^a$ the movements which they severally impart are added together in exactly the same manner as described with reference to Fig. 6. When the pinions $60^b$ to $67^b$ are meshed with the wheels $68^a$ to $75^a$ the movements which they severally impart are also added together, but the worm $81^a$ is moved in the direction opposite to that imparted by pinions $60^a$ to $67^a$. For example, if the wheels $68^a$ and $69^a$ are simultaneously rotated by means of the pinions $60^a$ and $64^a$ respectively, the worm $81^a$ is moved $1 + 2 = 3$ millimeters, but if, while the wheel $69^a$ is being rotated by the pinion $64^a$, the wheel $68^a$ is rotated by the pinion $60^b$ instead of $60^a$, the movements severally imparted to the worm by the rotation of the wheels $68^a$ and $69^a$ are in opposite directions, and the worm moves $2 - 1 = 1$ millimeter.

What I claim as my invention and desire to secure by Letters Patent is:

1. Mechanism for converting a uniform rotary movement into a variable rectilinear movement, comprising in combination a frame, a shaft mounted revoluble in the latter, a worm movable axially in the frame, a train of gearing comprising a series of interconnected gear-members, and means for actuating said gear-members severally and collectively from said shaft, said gear-members being adapted to actuate said worm, said gear-members being so proportioned that the values of the movements which they severally impart to said worm are in geometrical series.

2. In mechanism for converting a uniform rotary movement into a variable rectilinear movement, the combination, with a frame, of two shafts revoluble in opposite directions therein, a worm movable axially in the frame, a series of driving pinions arranged alternately on said shafts, and a gear-train comprising a series of inter-connected planet-pinions and carriers for the same adapted to be severally meshed with said driving pinions, said gear-train being adapted to actuate said worm, the members of said gear-train being so proportioned that the movements which they severally impart to said worm are in geometrical series.

3. In mechanism for converting a uniform rotary movement into a variable rectilinear movement, the combination, with a frame, of two shafts revoluble in opposite directions therein, a worm movable axially in the frame, a series of slidable driving pinions arranged alternately on said shafts, and a gear-train comprising a series of inter-connected planet-pinions and carriers for the same adapted to be severally meshed with said driving pinions, said gear-train being adapted to actuate said worm, the members of said gear-train being so proportioned that the movements which they severally impart to said worm are in geometrical series.

4. In mechanism for converting a uniform rotary movement into a variable rectilinear movement, the combination, with a frame, of two shafts revoluble in opposite directions therein, a worm movable axially in the frame, a series of slidable driving pinions arranged alternately on said shafts, a gear-train comprising a series of inter-connected planet-pinions and carriers for the same adapted to be severally meshed with said driving pinions, said gear-train being adapted to actuate said worm, and a second series of driving pinions mounted slidable alternately on said two shafts and adapted to be severally meshed with the planet-wheel carriers, whereby the latter can be alternately rotated in either direction, the members of said gear-train being so proportioned that the movements which they severally impart to said worm are in geometrical series.

5. In mechanism for converting a uniform rotary movement into a variable rectilinear movement, the combination, with a frame, of two shafts revoluble in opposite directions therein, a worm movable axially in the frame, a series of slidable driving pinions arranged alternately on said shafts, and a gear-train comprising a series of inter-connected planet-pinions and carriers for the same adapted to be severally meshed with said driving pinions, said gear-train being adapted to actuate said worm, the spindle of said worm traversing said planet-wheel carriers, the members of said gear-train being so proportioned that the movements which they severally impart to said worm are in geometrical series.

6. In mechanism for converting a uniform rotary movement into a variable rectilinear movement, the combination, with a frame, of two shafts revoluble in opposite directions therein, a worm movable axially in the frame, a series of slidable driving pinions arranged alternately on said shafts, and a gear-train comprising a series of inter-connected planet-pinions and carriers for the same adapted to be severally meshed with said driving pinions, said gear-train being adapted to actuate said worm, and means for automatically locking said planet-pinion carriers when the respective driving pinions are disengaged therefrom, the members of said gear-train being so proportioned that the movements which they severally impart to said worm are in geometrical series.

7. In mechanism for converting a uniform rotary movement into a variable rectilinear movement, the combination, with a frame, of a driving shaft revoluble in said frame, a radially slotted disk fixed on said shaft, a second shaft revoluble in said frame and geared with the former shaft, a worm movable axially in the frame, pinions on each of said shafts, a gear-train, substantially as shown, adapted to be actuated by said pinions for actuating said worm, and a continuously rotating arm adapted to engage in the slots in said disk and intermittently rotate said driving shaft and transmit movement to the gear-train, for the purpose specified.

In testimony whereof, I affix my signature in the presence of two witnesses.

JOHANN JAKOB KNECHT.

Witnesses:
  WILLIAM J. KOUJETSUY,
  FREDERICK J. DIETZMAN.